US012731282B2

(12) United States Patent
Matsunaga

(10) Patent No.: US 12,731,282 B2
(45) Date of Patent: Sep. 8, 2026

(54) METHOD FOR MEASURING THREE-DIMENSIONAL ABSOLUTE POSITION OF OBJECT TO BE MEASURED AND METHOD FOR DETECTING POSITION OF MOLTEN MATERIAL

(71) Applicant: JFE STEEL CORPORATION, Tokyo (JP)

(72) Inventor: Ryotaro Matsunaga, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 141 days.

(21) Appl. No.: 18/728,277

(22) PCT Filed: Dec. 7, 2022

(86) PCT No.: PCT/JP2022/045050
§ 371 (c)(1),
(2) Date: Jul. 11, 2024

(87) PCT Pub. No.: WO2023/139956
PCT Pub. Date: Jul. 27, 2023

(65) Prior Publication Data

US 2025/0095188 A1 Mar. 20, 2025

(30) Foreign Application Priority Data

Jan. 19, 2022 (JP) ................................ 2022-006213

(51) Int. Cl.
*G06T 7/70* (2017.01)

(52) U.S. Cl.
CPC .................................... *G06T 7/70* (2017.01)

(58) Field of Classification Search
CPC ................................................. G06T 7/70–85
See application file for complete search history.

(56) References Cited

U.S. PATENT DOCUMENTS 5,905,568 A 5/1999 McDowell et al.

FOREIGN PATENT DOCUMENTS

CN 102338617 A 2/2012
CN 108646259 A 10/2018
(Continued)

OTHER PUBLICATIONS

Feb. 7, 2023 Search Report issued in International Patent Application No. PCT/JP2022/045050.
(Continued)

*Primary Examiner* — Raphael Schwartz
(74) *Attorney, Agent, or Firm* — Oliff PLC

(57) ABSTRACT

A method includes measuring three-dimensional coordinates of a point from a remote position even in a case where the point is in a dangerous zone where a person cannot enter and directly measure coordinates. The method is for measuring, from an image, a three-dimensional absolute position of a measurement point present on a plane including any three points on an object to be measured by using a three-dimensional orthogonal coordinate system. The method includes measuring a relative position between a reference point present on the plane and a camera, acquiring an image by imaging the measurement point by the camera, calculating, from the image, three-dimensional relative position coordinates of the measurement point while using a lens position of the camera as an origin, and calculating the three-dimensional absolute position of the measurement point from the relative position and the three-dimensional relative position coordinates.

4 Claims, 6 Drawing Sheets

(a)

(b)

(56) References Cited

FOREIGN PATENT DOCUMENTS

| | | | | | |
|---|---|---|---|---|---|
| CN | 112785576 | A | * | 5/2021 | ........... G06T 7/0004 |
| CN | 113112427 | B | * | 5/2024 | ............... G06T 5/70 |
| EP | 2703776 | A1 | | 3/2014 | |
| EP | 3104329 | A1 | | 12/2016 | |
| JP | H08-269531 | A | | 10/1996 | |
| JP | 2004-163271 | A | | 6/2004 | |
| JP | 2006-258486 | A | | 9/2006 | |
| JP | 2012-027000 | A | | 2/2012 | |
| JP | 2021-148566 | A | | 9/2021 | |
| RU | 2193798 | C2 | | 11/2002 | |
| RU | 2643619 | C2 | | 2/2018 | |
| RU | 2749654 | C1 | | 6/2021 | |
| WO | 98/50889 | A1 | | 11/1998 | |
| WO | 0135053 | A1 | | 5/2001 | |
| WO | 2020/138345 | A1 | | 7/2020 | |

OTHER PUBLICATIONS

Jan. 9, 2024 Office Action issued in Taiwanese Patent Application No. 111147887 (with concise explanation of relevance in English).

Nov. 7, 2023 Office Action issued in Japanese Patent Application No. 2023-512706 (with concise explanation of relevance in English).

Dec. 6, 2024 Office Action issued in Russian Patent Application No. 2024118593.

Mallick, "Geometry of Image Formation" <https://web.archive.org/web/20210802025129/https://learnopencv.com/geometry-of-image-formation/> 7 pages (Aug. 2, 2021).

Mar. 18, 2025 Extended Search Report issued in European Patent Application No. 22922107.2.

May 28, 2026 Office Action issued in Korean Patent Application No. 10-2024-7023006 (with concise explanation of relevance in English).

* cited by examiner (a)

POINT P' (x, y, -c)
y
x
z
14

(b)

METHOD FOR MEASURING THREE-DIMENSIONAL ABSOLUTE POSITION OF OBJECT TO BE MEASURED AND METHOD FOR DETECTING POSITION OF MOLTEN MATERIAL

TECHNICAL FIELD

This disclosure relates to a technique of measuring a three-dimensional absolute position of a measurement point on an object to be measured by using an image.

BACKGROUND ART

Three-dimensional image measurement is to measure, from an image taken by a camera, a position of a subject in a three-dimensional space, a three-dimensional shape of the subject, a length of the subject, and the like. There are a wide variety of methods for the three-dimensional image measurement.

In one example, an object to be measured is imaged by using two cameras, and triangulation is performed. In the triangulation, a distance between the two cameras is known, and all angles of a triangle formed by one point of the object to be measured and the two cameras can be obtained, and therefore three-dimensional coordinates of the object to be measured can be obtained. According to this method, in a case where a position of the object to be measured does not change with the passage of time, triangulation can be applied by imaging the object to be measured while moving one camera instead of using the two cameras. Patent Literature 1 employs a method of applying triangulation by imaging an object to be measured from different positions and different angles by using one camera in order to find a position of the object to be measured present in a three-dimensional space.

Another method of the three-dimensional image measurement is a method called a monocular vision method of calculating three-dimensional coordinates of a subject by using only one camera and one image. In Patent Literature 2, three-dimensional coordinates of an object to be measured are calculated by imaging four reference points whose three-dimensional coordinates are known and calculating distortion of a camera lens, and camera position and angle.

An iron-making process includes a pig iron manufacturing step of manufacturing molten iron by reaction of iron ore and coke in a furnace under a high-temperature high-pressure condition. In the pig iron manufacturing step, molten iron is mainly produced in a furnace called a blast furnace. The molten iron is an ultra-high temperature fluid of approximately 1500° C. and is drained through a taphole provided in a lower portion of the blast furnace.

Immediately before the end of the drainage, a phenomenon called turbulent tapping in which gas in the furnace is energetically ejected out from the taphole occurs due to lowering of a liquid surface of residual molten iron and slag. The energetically ejected gas contains carbon monoxide gas. Since the tapping involves risks such as a burn given by molten iron scattered by the turbulent tapping and an oxygen deficiency caused by the ejected carbon monoxide gas, a pig iron manufacturing factory has a dangerous zone where the presence of persons is prohibited. Therefore, to measure a length of a specific object and a distance between objects in the dangerous zone, three-dimensional image measurement using a camera is effective.

CITATION LIST

Patent Literature

PTL 1: Japanese Unexamined Patent Application Publication No. 2006-258486

PTL 2: Japanese Unexamined Patent Application Publication No. 2012-027000

SUMMARY

Technical Problem

The technique of Patent Literature 1 involves a step of performing imaging two or more times by moving one camera and additionally requires equipment and machinery for moving the camera, and therefore a lot of hardware is needed to apply the technique. Furthermore, since imaging needs to be performed two or more times, the number of pieces of data handled in this technique is large, which leads to complexity, and it is therefore not easy to apply the technique. In addition, since measurement is performed by triangulation, an error is likely to occur if a distance between a measurement target point and a camera is markedly large as compared with a moving distance of the camera. That is, this technique cannot be executed in a case where a distance to an object to be measured is large and a place where a camera can be installed is narrow, and is therefore not suitable for measurement of a position of an object in a factory where a high-temperature object that can be placed in a limited place or toxic gas is present.

According to the technique of Patent Literature 2, coordinates of four known points (note, however, that any three points are not on an identical straight line) need to be stored in advance by using a single camera, and camera position and angle need to be calculated from the coordinates. Therefore, the technique cannot be applied unless as many as four known points can be prepared.

The present disclosure was accomplished in view of the above circumstance, and an object of the present disclosure is to provide a method that makes it possible to measure, from at least one image, a three-dimensional absolute position of a measurement point from a remote position even in a dangerous zone where a person cannot enter and directly measure coordinates by using a measure or the like.

Solution to Problem

Means to solve the above problem is as follows.

[1] A method for measuring, from an image, a three-dimensional absolute position of a measurement point present on a plane including any three points on an object to be measured by using a three-dimensional orthogonal coordinate system, the method including:

- measuring a relative position between a reference point and a camera;
- acquiring an image by imaging the measurement point by the camera;
- calculating, from the image, three-dimensional relative position coordinates of the measurement point while using a lens position of the camera as an origin; and
- calculating the three-dimensional absolute position of the measurement point from the relative position and the three-dimensional relative position coordinates.

[2] The method according to [1], in which the plane is a plane including two of three orthogonal axes of the three-dimensional orthogonal coordinate system.

[3] The method according to [1], in which the measurement point is a point on a fluid present on the plane.

[4] The method according to [2], in which the measurement point is a point on a fluid present on the plane.

[5] A molten material position detection method for measuring a three-dimensional absolute position of a measurement point on a molten material drained from a furnace having, in a lower portion thereof, a drainage hole through which the molten material is drained by using the method according to any one of [1] to [4].

Advantageous Effects

According to the present disclosure, it is possible to measure a three-dimensional absolute position of a measurement point from at least one image. It is therefore possible to easily measure, from an image, a three-dimensional absolute position of an object to be measured from a remote position even in a case where the object to be measured is in a dangerous zone where a person cannot enter and directly measure coordinates by a measure or the like, such as a zone where a fluid flows out, a zone where a high-temperature object is present, and a zone where toxic gas is present.

DETAILED DESCRIPTION OF EMBODIMENTS

Next, an embodiment of the present disclosure is described.

[Image Measurement Method]

Figure 1:
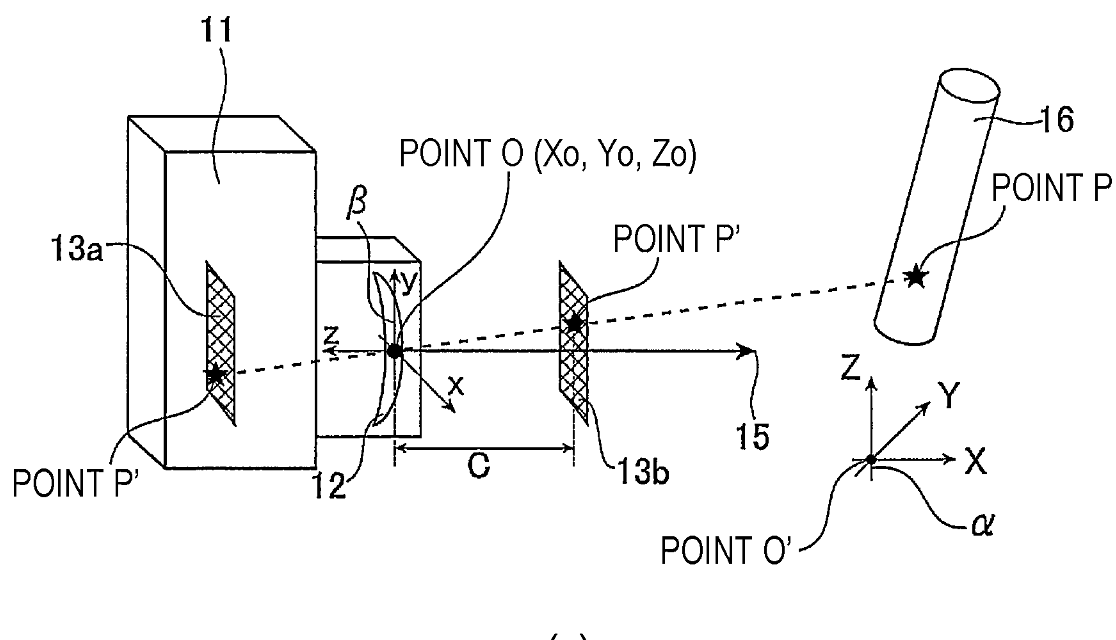
FIGS. 1(*a*) and 1(*b*) are schematic views illustrating a positional relationship between a point P in a three-dimensional space and a point P' in an image in the three-dimensional space.

FIG. 1 illustrates a positional relationship between a camera and a measurement point P on an object to be measured. The following describes a method for measuring a three-dimensional absolute position of an object to be measured 16 according to the present disclosure with reference to FIG. 1.

First, a camera is installed at a place where a relative position between a reference point O' (0, 0, 0) and the camera can be measured, and a position of the reference point O' and a position of the camera are measured. This is a step of measuring a relative position between a reference point and a camera. Although the reference point O' can be set at any place, both the measurement point P and the reference point O' may be present on a plane including any three points on the object to be measured. Although the reference point O' is an origin (0, 0, 0) of an absolute coordinate system & that is a three-dimensional orthogonal coordinate system in the present description for convenience of description as illustrated in FIG. 1(*a*), the reference point O' is not limited to this and may be any point on the absolute coordinate system $\alpha$.

In image measurement of the present disclosure, a formula expressing a relative positional relationship between the measurement point in a taken image and the camera is used. First, a range including the measurement point is imaged by the camera 11. This is a step of acquiring an image. The point P imaged by the camera 11 and a central point O (hereinafter also referred to simply as a point O) of a lens 12 in the camera are present as illustrated in FIG. 1(*a*). The camera includes an image sensor that detects light collected onto the lens. Since an image appearing on the image sensor 13*a* is inverted, it is assumed that a virtual image sensor 13*b* is present ahead of the lens and an erect image appears on the virtual image sensor 13*b*. Coordinates of a three-dimensional space where the measurement point P on the object to be measured is present can be defined by any absolute coordinate system $\alpha$. In the description of the present embodiment, a three-dimensional orthogonal coordinate system whose origin is the reference point O' is used, as described above. In the absolute coordinate system $\alpha$, the position of the central point O of the lens 12 is (Xo, Yo, Zo) [m], and the position of the subject point P is (X, Y, Z) [m].

By imaging using the camera 11 of FIG. 1(*a*), light that has been emitted from the point P and has passed through the virtual image sensor 13*b* is detected, and finally an image 14 illustrated in FIG. 1(*b*) can be obtained. The point P appearing in the image 14 is referred to as a point P', and the point P' is an intersection of a segment OP and the virtual image sensor 13*b*, as illustrated in FIG. 1(*a*).

When a photography coordinate system $\beta$ that has an xy plane parallel with a plane formed by the virtual image sensor 13*b*, has a z axis in a direction opposite to an optical axis 15 of the camera, and has an origin at a position of the lens is defined as illustrated in FIG. 1(*a*), a position of the point P' on the photography coordinate system $\beta$ is expressed as (x, y, -c) using a distance c between the camera lens 12 and the virtual image sensor 13*b*. x, y are coordinates on the photography coordinate system $\beta$ obtained by unit conversion of coordinates [pixels] of the point P in the image 14 into [m] on the basis of a size of the virtual image sensor 13*b* and resolution of the image 14. This is a step of calculating, from the image, three-dimensional relative position coordinates of the measurement point while using a lens position of the camera as an origin. The image element size and image size can be freely selected, and the coordinates of the measurement point can be obtained more accurately as the resolution of the image becomes higher.

Since the point O, the point P', and the point P are present on an identical straight line as illustrated in FIG. 1(*a*), a relationship among these points can be expressed by the formula (1) on the basis of a collinearity condition.

[Math. 1]

$$\begin{Bmatrix} X \\ Y \\ Z \end{Bmatrix} = k\left(R * \begin{Bmatrix} x \\ y \\ -c \end{Bmatrix}\right) + \begin{Bmatrix} X_O \\ Y_O \\ Z_O \end{Bmatrix} \quad (1)$$

In the formula (1), k is any real number. R is a 3×3 rotation matrix for converting the photography coordinate system β into the absolute coordinate system α and is expressed by the formula (2).

[Math. 2]

$$R = \begin{bmatrix} R_{1,1} & R_{2,1} & R_{3,1} \\ R_{1,2} & R_{2,2} & R_{3,2} \\ R_{1,3} & R_{2,3} & R_{3,3} \end{bmatrix} = \begin{bmatrix} 1 & 0 & 0 \\ 0 & \cos\omega & -\sin\omega \\ 0 & \sin\omega & \cos\omega \end{bmatrix} \begin{bmatrix} \cos\varphi & 0 & \sin\varphi \\ 0 & 1 & 0 \\ -\sin\varphi & 0 & \cos\varphi \end{bmatrix} \begin{bmatrix} \cos\kappa & -\sin\kappa & 0 \\ \sin\kappa & \cos\kappa & 0 \\ 0 & 0 & 1 \end{bmatrix} \quad (2)$$

The rotation matrix R defined by the formula (2) is a rotation matrix obtained when the x, y, and z axes of the photography coordinate system β are rotated in an order of z, y, and x by K, φ and ω [rad], respectively so that the photography coordinate system β matches the absolute coordinate system α. In the present disclosure, clockwise rotation about an axis is referred to as positive rotation. The rotation matrix R expressed by the formula (2) is merely an example, and therefore an order in which the axes are rotated may be changed or the same axis may be rotated two or more times as long as the photography coordinate system β and the absolute coordinate system α match. The formula (1) is a formula having three components, and when k included in the formulas of the x, y components is deleted by the formula of the z component, formulas such as the following formulas (3-x) and (3-y) can be derived.

[Math. 3]

$$x = -c\frac{R_{1,1}(X - Xo) + R_{2,1}(Y - Yo) + R_{3,1}(Z - Zo)}{R_{1,3}(X - Xo) + R_{2,3}(Y - Yo) + R_{3,3}(Z - Zo)} \quad (3\text{-}x)$$

[Math. 4]

$$y = -c\frac{R_{1,2}(X - Xo) + R_{2,2}(Y - Yo) + R_{3,2}(Z - Zo)}{R_{1,3}(X - Xo) + R_{2,3}(Y - Yo) + R_{3,3}(Z - Zo)} \quad (3\text{-}y)$$

(X, Y, Z) [m] are three-dimensional absolute coordinates of the point P. The two formulas (3-x) and (3-y) include three unknown numbers X, Y, and Z, and another formula is needed to uniquely determine these numbers. In a case where the point P, which is a measurement point, is present on a plane including any three points on the object to be measured, an equation F of the plane on which the point P is present such as the formula (4) can be used as a condition.

$$F(X,Y,Z)=0 \quad (4)$$

By adding the formula (4), a relative position between the point P and the camera can be found.

The step of acquiring an image by imaging using a camera and the step of calculating three-dimensional relative position coordinates while using a lens position of the camera as an origin may be performed before the step of calculating a relative position between the reference point O' and the camera or may be performed after the step of calculating a relative position between the reference point O' and the camera.

In addition to the formulas (3-x) and (3-y) and the formula (4), x, y, and c, which are three-dimensional relative position coordinates using the lens position of the camera as an origin, are known values, and therefore it is only necessary to solve the three formulas for the three unknown numbers. In this way, X, Y, and Z, which are a three-dimensional absolute position to be found, can be uniquely determined. The above is a step of calculating a three-dimensional absolute position of an object to be measured from a relative position between the reference point O' and the camera and three-dimensional relative position coordinates of the measurement point using the lens position of the camera as an origin.

In the present disclosure, positional information (the relative position between the reference point and the camera) in a three-dimensional coordinate system is used to calculate parameters used in the rotation matrix. However, in a case where a camera stand such as a tripod by which a camera installation position can be checked is not used, it is sometimes difficult to acquire any one of three-dimensional coordinates. In this case, it is only necessary to measure a distance between the reference point and the camera position by a laser rangefinder or the like and then geometrically find coordinates of an axis that has not been acquired from the three-dimensional coordinates of the camera installation position and the distance. The camera angle in the present disclosure refers to an imaging angle of the camera with respect to a point on a plane where the object to be measured is present.

A plane on which both of the point P, which is a measurement point, and the reference point O' are present is preferably a plane including two of three orthogonal axes of the three-dimensional orthogonal coordinate system. This is because in a case where the plane on which both of the point P, which is a measurement point, and the reference point O' are present is a plane including two of three orthogonal axes of the three-dimensional orthogonal coordinate system, coordinates to be found are a point on a two-dimensional orthogonal coordinate system, and the coordinates of the measurement point can be more easily found.

Furthermore, the measurement point to be measured in the present disclosure is preferably a point on a fluid present on a plane including three any points on an object to be measured. This is because a fluid ejected into the air forms a parabola in the same plane in a case where force having a component perpendicular to a direction of gravitational force is not applied, and therefore coordinates of a measurement point on the fluid can be easily found as described above. Furthermore, the object to be measured in the present disclosure is preferably a molten material drained from a furnace having, in a lower portion thereof, a drainage hole through which the molten material is drained, and the measurement point is preferably a point on the molten material. That is, it is preferable to provide a molten material position detection method of detecting a position of a molten material by using the absolute position measurement method of the present disclosure. This is because not only the effect of easily finding coordinates of a measurement point on a fluid is produced since the molten material drained from the furnace is a fluid, but also an effect of measuring coordinates by using an image from a remote position even in a dangerous zone where a person cannot enter and directly measure coordinates by a measure or the like is produced since the molten material has a high temperature.

EXAMPLES

Example 1

Figure 2:
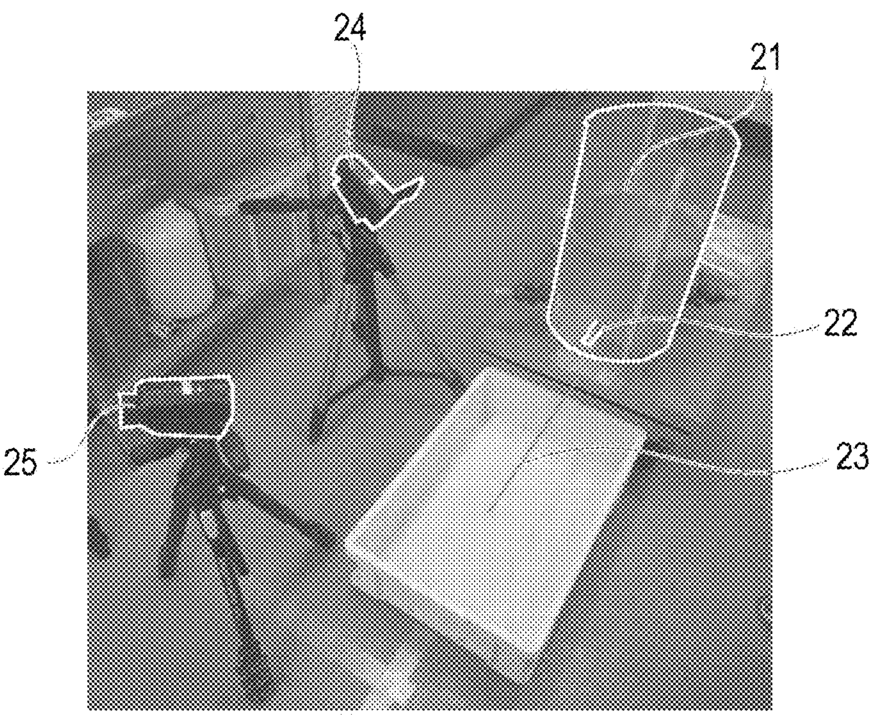
FIG. 2 is a photograph showing a whole apparatus of Example 1.

A verification experiment was conducted to confirm validity of the present disclosure. FIG. 2 illustrates how the verification experiment was conducted. In the experiment, tapping of a blast furnace was simulated by using a simplified tapping model 21 (hereinafter also referred to simply as a model) created by forming a drainage hole 22 through which a liquid can be drained in a cylindrical plastic container modeling after a blast furnace. Directly below the drainage hole 22, a bar 23 (hereinafter also referred to simply as a bar) having a scale marked at constant intervals was attached. During the experiment, imaging was performed by using two cameras 24 and 25.

A point where the liquid drained through the drainage hole 22 landed on the bar 23 was read from the scale in an image taken by the camera 24, and actual measurement values of three-dimensional coordinates thus obtained were compared with calculated values according to the present disclosure.

Figure 3:
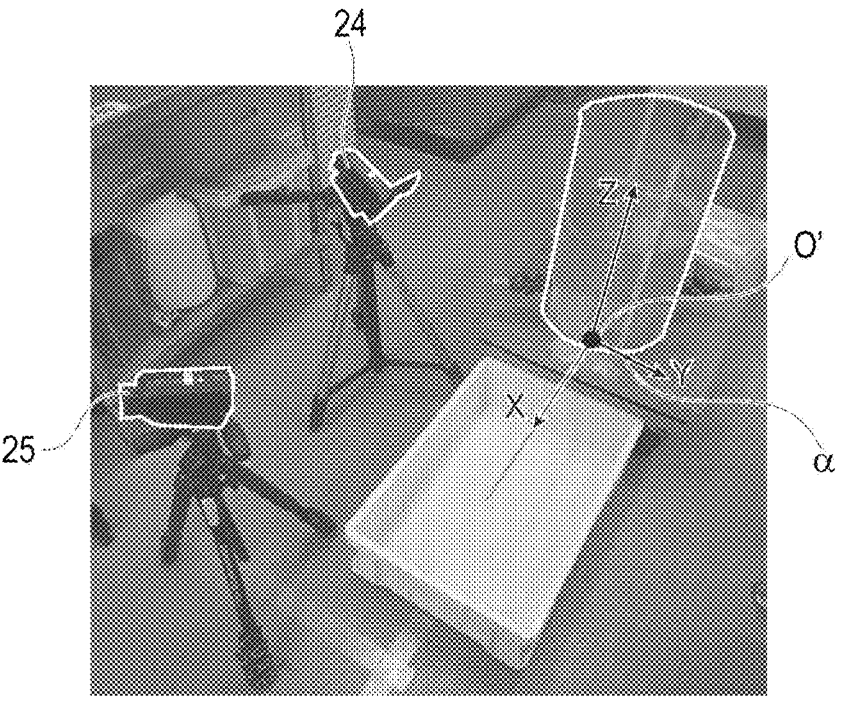
FIG. 3 is a photograph showing a three-dimensional absolute coordinate system set in Example 1.

In the experiment, the three-dimensional absolute coordinate system α was set as illustrated in FIG. 3. The origin O' of the absolute coordinate system α was set at an outlet of the drainage hole 22. The X axis was set parallel with the bar 23 so that a direction from the model 21 to the outlet of the drainage hole 22 was a positive direction. The Y axis was set so that the XY plane was parallel with the ground, and the Z axis was set to point upward.

Figure 4:
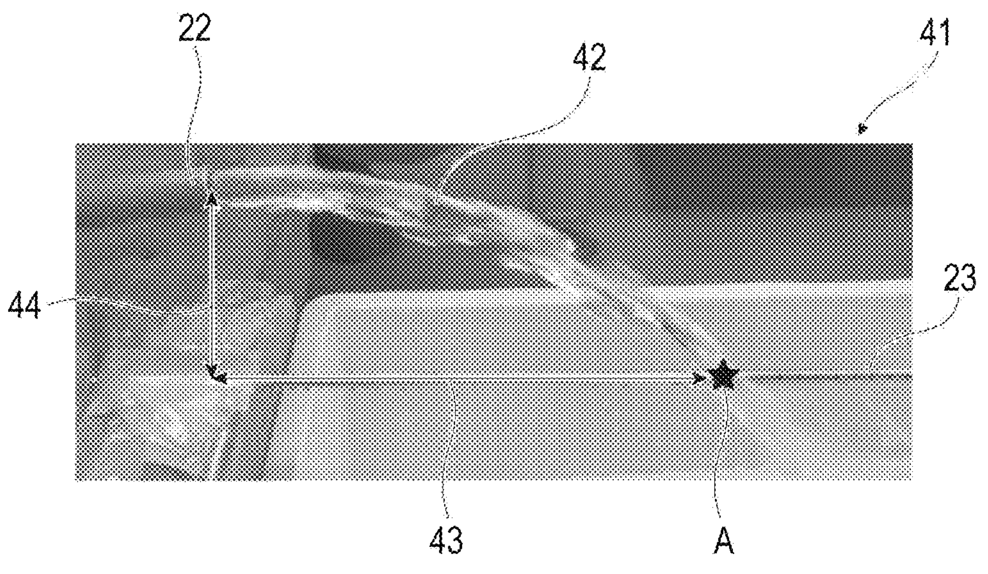
FIG. 4 is a photograph showing an image taken by a camera 24 of Example 1.

Next, a measurement method for measuring three-dimensional coordinates of a measurement point A, which is a point on a fluid, by using an image obtained from the camera 24 in this experiment is described. FIG. 4 illustrates a part of an image obtained by the camera 24 in this experiment. An image 41 can be obtained by imaging, from a side, a drainage flow 42 of the liquid drained from the model 21 by using the camera 24. As illustrated in FIGS. 3 and 4, the bar 23 and the X axis were set parallel with each other, and the Z axis was set to extend vertically from the drainage hole 22 in a direction perpendicular to the X axis. The drainage hole 22 was located on the XZ plane, and the direction of the drainage hole was adjusted so that the drainage flow 42 was always present on a plane of Y=0. Since the measurement point A is present on the plane of Y=0, a tapping flow flying distance 43 can be measured from the bar 23 in the image 41. Furthermore, when a drainage hole height 44 is additionally measured, three-dimensional coordinates of the measurement point A can be obtained. Values thus obtained are regarded as actual measurement values.

The following describes how the present disclosure was applied to the measurement point A in the experiment.

Figure 5:
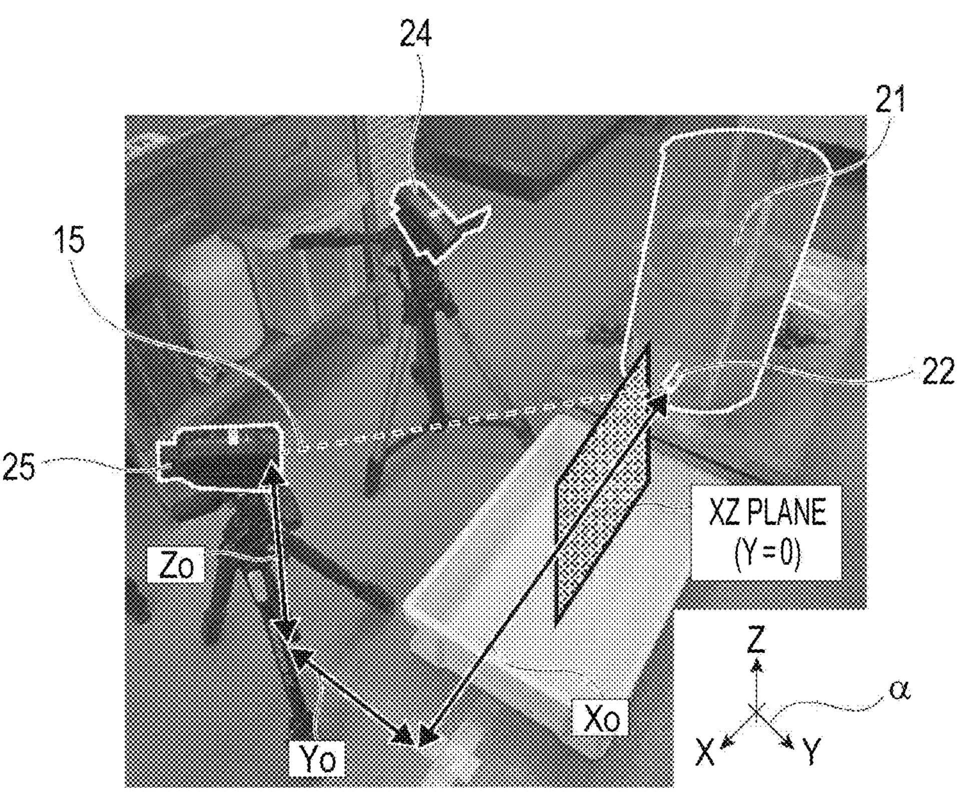
FIG. 5 is a photograph showing a positional relationship between a camera 25 and a drainage hole 22 of Example 1.
Figure 6:
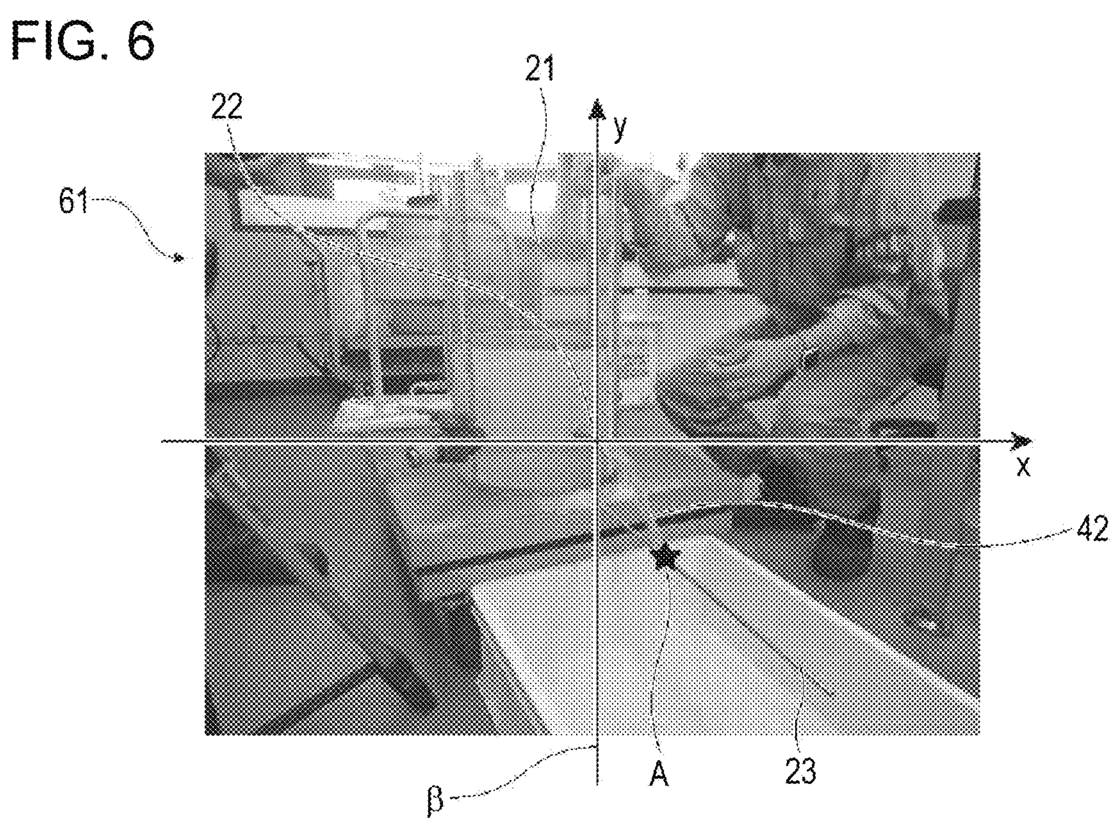
FIG. 6 is a photograph showing an image taken by the camera 25 of Example 1.

The technique of the present disclosure is applied by imaging the drainage flow 42 by the camera 25. FIG. 5 illustrates a positional relationship between the camera 25 and the drainage hole 22 of the model 21. Coordinates of the camera 25 in the absolute coordinate system α are (Xo, Yo, Zo) [m], and a coordinate point O' of the outlet of the drainage hole 22 is (0, 0, 0). First, Xo, Yo, Zo were accurately measured in the experiment in accordance with the set absolute coordinate system α, and thus the coordinates of the camera 25 were obtained. An angle of the camera 25 was set so that a camera optical axis intersected the drainage hole 22. FIG. 6 illustrates an image 61 taken by the camera 25. A relative position between the point O' (0, 0, 0) and (Xo, Yo, Zo) is found and the photography coordinate system β is rotated about the x axis, the y axis, and the z axis so that the x axis of the photography coordinate system β matches the X axis of the absolute coordinate system α, the y axis of the photography coordinate system β matches the Y axis of the absolute coordinate system α, and the z axis of the photography coordinate system β matches the Z axis of the absolute coordinate system α. An order in which the axes are rotated may be changed or the same axis may be rotated two or more times as long as the photography coordinate system β and the absolute coordinate system α match. Specifically, the z axis of the photography coordinate system β is first rotated by $K_1$, and then the y axis is rotated by φ. Finally, the z axis is rotated by $K_2$ again so that the photography coordinate system β matches the absolute coordinate system α, and thus a rotation matrix R was obtained. The rotation matrix R in this experiment is expressed by the formula (5).

[Math. 5]

$$R = \begin{bmatrix} R_{1,1} & R_{2,1} & R_{3,1} \\ R_{1,2} & R_{2,2} & R_{3,2} \\ R_{1,3} & R_{2,3} & R_{3,3} \end{bmatrix} = \begin{bmatrix} \cos\kappa_2 & -\sin\kappa_2 & 0 \\ \sin\kappa_2 & \cos\kappa_2 & 0 \\ 0 & 0 & 1 \end{bmatrix} \begin{bmatrix} \cos\varphi & 0 & \sin\varphi \\ 0 & 1 & 0 \\ -\sin\varphi & 0 & \cos\varphi \end{bmatrix} \begin{bmatrix} \cos\kappa_1 & -\sin\kappa_1 & 0 \\ \sin\kappa_1 & \cos\kappa_1 & 0 \\ 0 & 0 & 1 \end{bmatrix} \quad (5)$$

The distance c between the camera lens of the camera 25 and an image sensor was found in advance. Table 1 shows parameters used in this experiment.

TABLE 1

| Parameters used in the experiment | |
|---|---|
| Xo[m] | 0.80 |
| Yo[m] | −0.40 |
| Zo[m] | 0.21 |
| Φ[rad] | 1.339 |
| κ1[rad] | 1.571 |
| κ2[rad] | −0.464 |
| Distance c[m] | 0.0045 |

The following formula (6) can be used as a condition in a case where a plane has two of the three axes of the absolute coordinates (the XZ axis plane in the present Example).

$$Y = 0 \quad (6)$$

Next, coordinates (x, y, -c) of the measurement point A in the photography coordinate system β were calculated from an image taken by the camera 25 including Y=0, which includes three any points on the drainage flow 42, and the measurement point A.

In this measurement, a camera having an image element size of 6.2 mm×4.6 mm and an image size of 4608 pixels×3456 pixels was used.

Simultaneous quadratic equations of X and Z were derived by substituting the parameters of Table 1, Y=0, and the coordinates (x, y, -c) of the point A into the formulas (3-x) and (3-y), and the coordinates (X, 0, Z) of the point A in the absolute coordinate system α were calculated.

Figure 7:
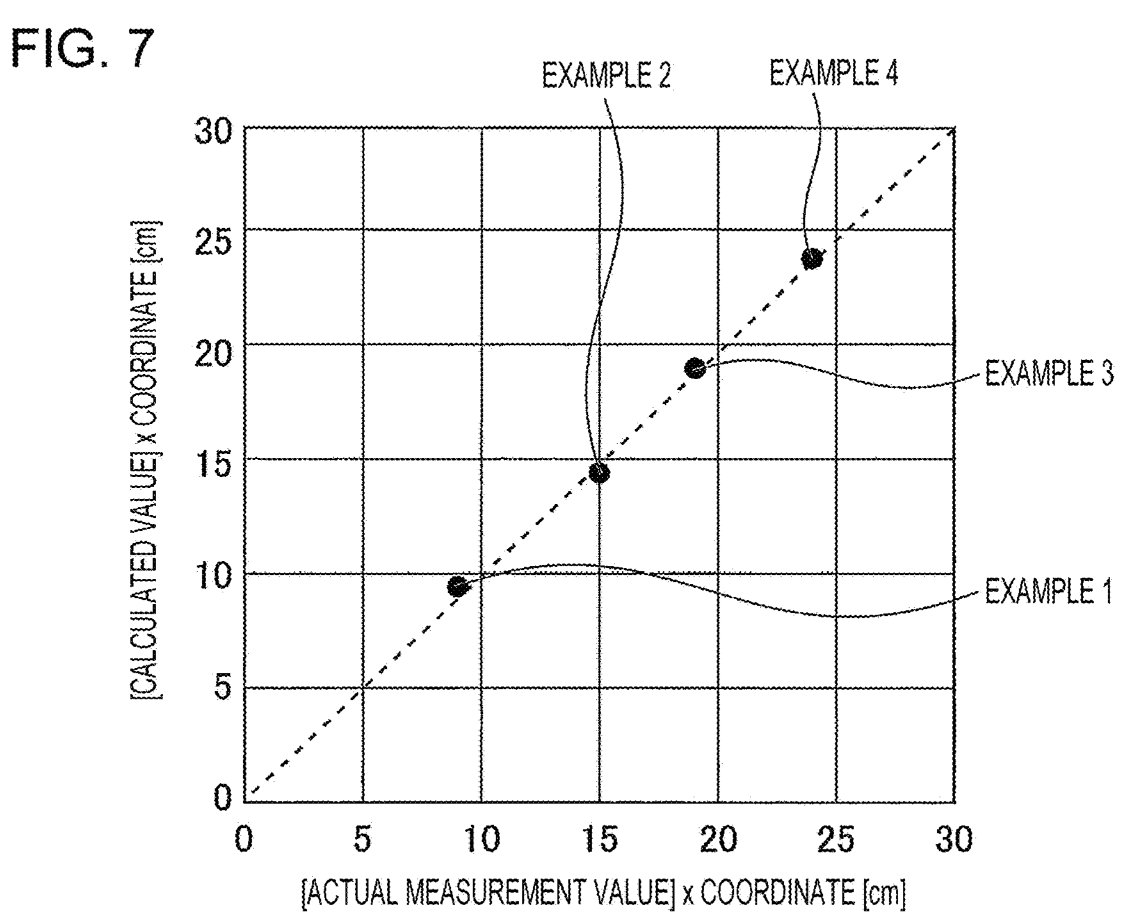
FIG. 7 is a graph comparing actual measurement values and calculated values of an X coordinate of a measurement point A.
Figure 8:
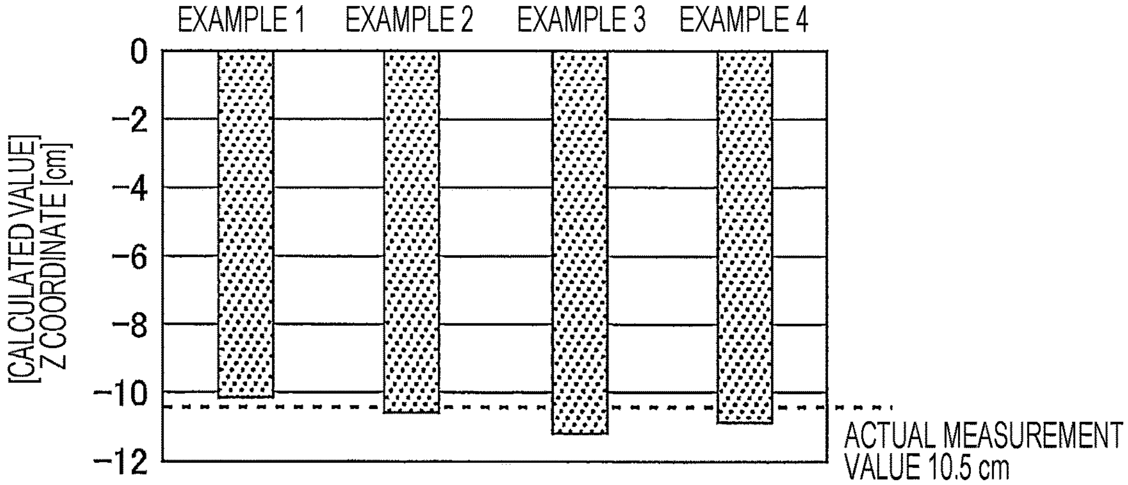
FIG. 8 is a graph comparing actual measurement values and calculated values of a Z coordinate of the measurement point A.

The coordinates of the measurement point A were measured four times by the above calculation method while changing an amount of liquid put into the model 21, and these measurements were regarded as Examples 1 to 4. FIGS. 7 and 8 illustrate results of comparison between calculated values measured by the present technique and the actual measurement values. It can be regarded from the results that the calculated values and the actual measurement values match. This shows validity of the present disclosure.

Example 2

Figure 9:
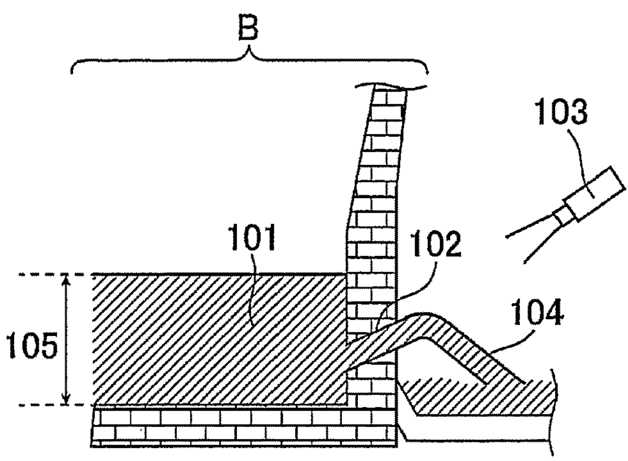
FIG. 9 is an image showing equipment of Example 2.
Figure 10:
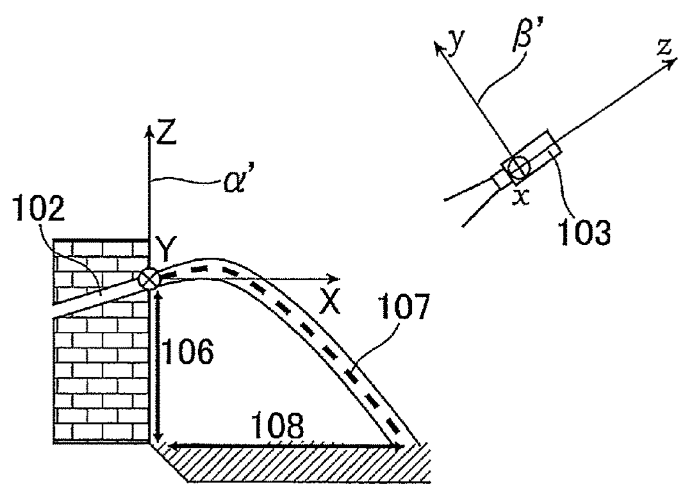
FIG. 10 is an image showing a three-dimensional absolute coordinate system set in Example 2.

In Example 2, detection of a height 105 of a molten material drained from a furnace B is attempted by using the present technique. Note that the height 105 of the molten material refers to a height from a furnace bottom to an upper surface of the molten material in the furnace B. A method performed in Example 2 is described by using FIG. 9. The furnace B has a capacity of approximately 5000 $m^3$ and has, in a lower portion thereof, a liquid pool 101 of the molten material and a drainage hole 102 through which the molten material is taken out from the furnace B. When the molten material flows out through the drainage hole 102, a molten material flow 104 is generated in a parabolic shape and is imaged by a camera 103 installed close to the furnace B. A position and a camera angle of the camera 103 in absolute coordinates are known. In Example 2, as illustrated in FIG. 10, the molten material flow 104 is imaged by the camera 103, and the present technique is applied to an image capturing the molten material flow 104 as a subject to find position coordinates on the molten material flow 104. Then, an equation of a parabola 107 of the molten material flow 104 illustrated in FIG. 10 is found, and a drainage speed of the molten material and the height 105 of the molten material are found from the equation in stages. The molten material height 105 thus found and the height 105 of the molten material geometrically found by actual measurement are compared, and thereby the position coordinate measurement method according to the present technique is verified. In Example 2, it was assumed that an absolute coordinate system α' has its origin at the drainage hole 102 and had a Z axis that points upward with respect to a horizontal plane and the molten material flow 104 was always present in the XZ plane. In this case, the equation of the parabola 107 is given by the formula (7) by using a gravitational acceleration g ($m/s^2$), a drainage speed $V_{tap}$ (m/s) of the molten material, and a drainage angle $\theta_{tap}$ (rad) of the molten material according to a similar principle to a trajectory drawn by a projected object.

[Math. 6]

$$Z = -\frac{g}{2v_{tap}^2\cos^2\theta_{tap}}X^2 + \tan\theta_{tap}X \quad (7)$$

On the other hand, a parabola that passes the origin (0, 0) in the XZ plane is given by the formula (8) by using constants a and b.

$$Z = aX^2 + bX \quad (8)$$

Since two numbers, specifically, the constants a and b are unknown in the formula (8), these numbers can be calculated if X and Z coordinates of two points on the parabola are known. In Example 2, absolute coordinates (X, 0, Z) of two points on the parabola are found from coordinates of the two points on a photography coordinate system β' and the formula (5) by using the present technique, the constants a and b of the formula (8) are calculated from the absolute coordinates of the two points, and the drainage speed and the drainage angle of the molten material are calculated from the constants a and b and the formula (7). Then, the height 105 of the molten material is found from the drainage speed of the molten material thus found according to the formulas (7) to (10) described in Japanese Patent No. 07056813.

The height 105 of the molten material found by the above method and the value of the height 105 of the molten material calculated on the basis of a drainage speed geometrically found from a drainage distance 108 of the molten material flow 104 and a drainage hole height 106 were compared. The method described in Japanese Patent No. 07056813 was also used to find the height 105 of the molten material from the drainage distance 108 and the drainage hole height 106.

Figure 11:
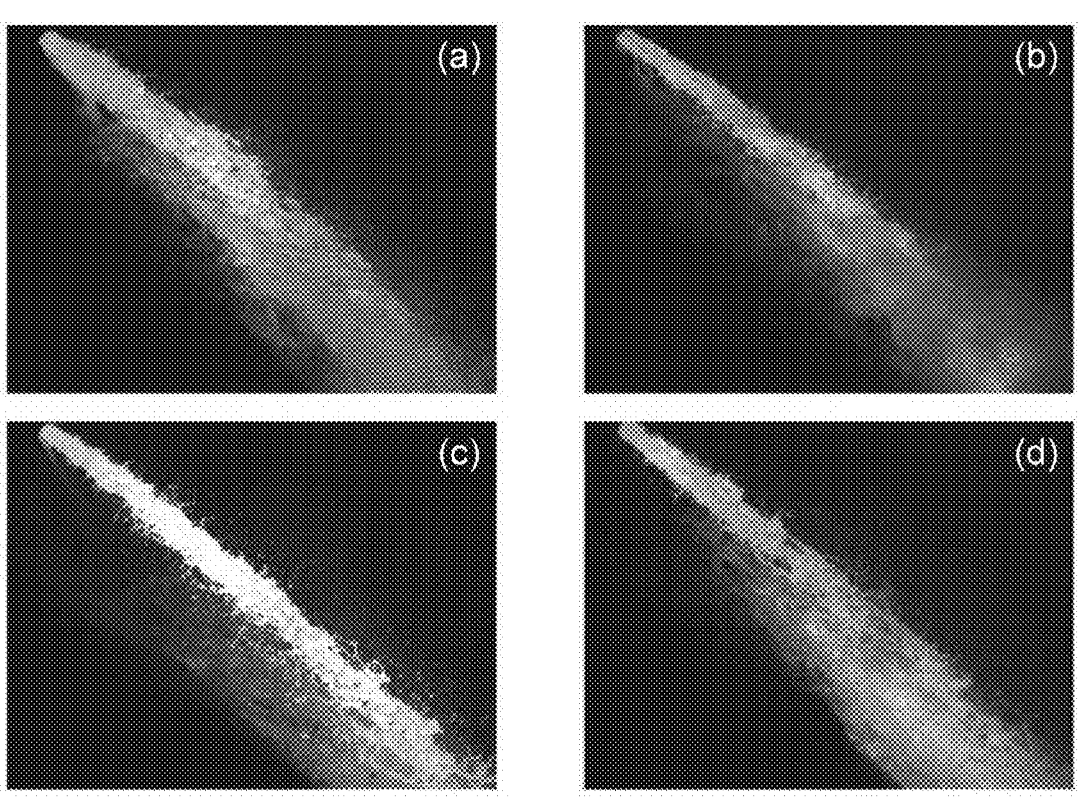
FIGS. 11(*a*) to (*d*) are photographs showing images taken by the camera 103 of Example 2.

A specific method for finding the height 105 of the molten material is described below. The present technique was applied to the photographs shown in FIGS. 11(*a*) to (*d*) taken by the camera 103. All the images shown in FIG. 11 have 2064 pixels×1544 pixels. In FIG. 11, the molten material flow 104 appearing in white is captured as a subject, and the molten material drained from the furnace B is accumulated below the molten material flow 104. In FIG. 11, positions on the molten material flow 104 on the absolute coordinates were found by substituting, into the formula (5), two points on the molten material flow 104 present at a position whose x coordinate in the photography coordinate system β' is-732 pixels and a position whose x coordinate in the photography coordinate system β' is −32 pixels, and the constants a and b were found by substituting the values into the formula (8) and solving simultaneous equations. Note that the images shown in FIGS. 11(*a*) to (*d*) were taken at different timings, and a camera angle was checked every time an image was taken to minimize external influence caused by passage of time and factory operation and increase accuracy of the present technique. Table 2 shows parameters used to apply the image processing in Example 2, and Table 3 shows parameters used to calculate the height 105 of the molten material and photography coordinates and absolute coordinates of the two points in (a) to (d).

TABLE 2

| Parameters used in the experiment | | | | |
|---|---|---|---|---|
| | (a) | (b) | (c) | (d) |
| Xo[m] | 5.5 | | | |
| Yo[m] | −3.5 | | | |
| Zo[m] | 4.4 | | | |
| Φ[rad] | 0.8834 | 0.8931 | 0.8758 | 0.8862 |
| κ1[rad] | 1.571 | 1.571 | 1.571 | 1.571 |
| κ2[rad] | −0.7115 | −0.6947 | −0.7251 | −0.7067 |
| Distance c[m] | 0.025 | | | |

TABLE 3

| Parameters used in the experiment | | (a) | (b) | (c) | (d) |
|---|---|---|---|---|---|
| Furnace pressure (furnace lower portion) (Pa) | | $4.02 \times 10^5$ | $3.94 \times 10^5$ | $4.12 \times 10^5$ | $4.10 \times 10^5$ |
| atmospheric pressure (Pa) | | $1.01 \times 10^5$ | | | |
| Taphole diameter (m) | | 0.0065 | | | |
| Taphole roughness (m) | | 0.001 | | | |
| Taphole length (m) | | 3.5 | 3.6 | 3.5 | 3.8 |
| Molten iron density ($kg/m^3$) | | 6700 | | | |
| Slag density ($kg/m^3$) | | 2650 | | | |
| Molten iron viscosity (Pa · s) | | 0.006 | | | |
| Slag viscosity (Pa · s) | | 0.381 | | | |
| Molten iron volume ratio (molten iron/molten iron + slag) | | 0.397 | 0.589 | 0.529 | 0.527 |
| Photograph coordinates (x, y, −c) | First point | (−0.00253, 0.00208, −0.025) | (−0.00253, 0.00219, −0.025) | (−0.00253, 0.00220, −0.025) | (−0.00253, 0.00223, −0.025) |
| | Second point | (−0.000110, 0.000162, −0.025) | (−0.000110, 0.000390, −0.025) | (−0.000110, 0.000300, −0.025) | (−0.000110, 0.000400, −0.025) |
| Absolute coordinates (X, 0, Z) | First point | (0.270, 0, 0.0868) | (0.0895, 0, 0.113) | (0.419, 0, 0.145) | (0.223, 0, 0.140) |
| | Second point | (1.39, 0, 0.0291) | (1.25, 0, 0.111) | (1.50, 0, 0.0774) | (1.35, 0, 0.114) |

Figure 12:
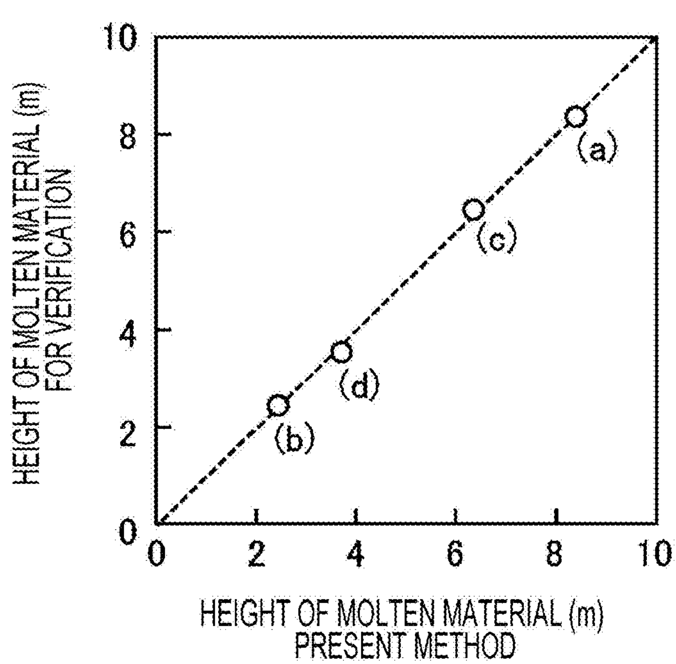
FIG. 12 is a graph comparing values found by the present technique and values for verification concerning a molten material height 105.

The equation of the parabola 107 of the molten material flow 104 was found from FIGS. 11(*a*) to (*d*), which were images taken by the camera 103, by using the parameters shown in Table 2. FIG. 12 illustrates results (HEIGHT OF MOLTEN MATERIAL (m) PRESENT METHOD, the horizontal axis) of finding the molten material height 105 from the parameters shown in Table 3 by using the present method and calculation results (HEIGHT OF MOLTEN MATERIAL (m) FOR VERIFICATION, the vertical axis) of the height 105 of the molten material calculated on the basis of the drainage speed geometrically found from the drainage distance 108 and the drainage hole height 106. As is clear from FIG. 12, both results almost match. Therefore, validity of the method of finding an absolute position from an image according to the present technique has been confirmed.

REFERENCE SIGNS LIST

The invention claimed is:

1. A method for measuring, from an image, a three-dimensional absolute position of a measurement point present on a plane including any three points on an object to be measured by using a three-dimensional orthogonal coordinate system, the method comprising:

measuring a relative position between a reference point and a camera;

acquiring an image by imaging the measurement point by the camera;

calculating, from the image, three-dimensional relative position coordinates of the measurement point while using a lens position of the camera as an origin, the origin being the reference point; and calculating the three-dimensional absolute position of the measurement point from the relative position and the three-dimensional relative position coordinates, wherein the measurement point is on a molten material drained from a furnace having, in a lower portion thereof, a drainage hole through which the molten material is drained.

2. The method according to claim 1, wherein the plane includes two of three orthogonal axes of the three-dimensional orthogonal coordinate system.

3. The method according to claim 1, wherein the measurement point is present on the plane.

4. The method according to claim 2, wherein the measurement point is present on the plane.

* * * * *